US008670305B2

(12) United States Patent
Peng et al.

(10) Patent No.: US 8,670,305 B2
(45) Date of Patent: Mar. 11, 2014

(54) ETHERNET SWITCH RING (ESR) PROTECTION METHOD AND TRANSIT NODE

(75) Inventors: Yuanyuan Peng, Shenzhen (CN); Tao Zhang, Shenzhen (CN); Liming Hong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 76 days.

(21) Appl. No.: 13/394,185

(22) PCT Filed: May 19, 2010

(86) PCT No.: PCT/CN2010/072933
§ 371 (c)(1),
(2), (4) Date: Mar. 5, 2012

(87) PCT Pub. No.: WO2011/026347
PCT Pub. Date: Mar. 10, 2011

(65) Prior Publication Data
US 2012/0163166 A1 Jun. 28, 2012

(30) Foreign Application Priority Data
Sep. 7, 2009 (CN) .......................... 2009 1 0092368

(51) Int. Cl.
*G06F 11/00* (2006.01)
(52) U.S. Cl.
USPC ............................ 370/225; 370/230; 370/235

(58) Field of Classification Search
USPC .............. 370/216–230, 230.1, 231, 235, 236, 370/237
See application file for complete search history.

(56) References Cited

U.S. PATENT DOCUMENTS

| 6,766,482 | B1 | 7/2004 | Yip et al. |
| 6,928,050 | B2 * | 8/2005 | Lynch et al. .................. 370/224 |
| 6,938,189 | B2 * | 8/2005 | Johnson et al. ................. 714/44 |
| 7,630,300 | B2 * | 12/2009 | Warren et al. ................. 370/222 |
| 7,660,316 | B2 * | 2/2010 | Warren et al. ................. 370/401 |
| 7,876,762 | B2 * | 1/2011 | Yang .......................... 370/395.3 |
| 2005/0201275 | A1 * | 9/2005 | Ying et al. .................... 370/222 |
| 2006/0245351 | A1 | 11/2006 | Pande et al. |
| 2009/0207726 | A1 | 8/2009 | Thomson et al. |
| 2011/0173489 | A1 * | 7/2011 | Song .............................. 714/4.3 |

FOREIGN PATENT DOCUMENTS

| CN | 101075934 A | 11/2007 |
| CN | 101247306 A | 8/2008 |
| CN | 101640622 A | 2/2010 |

* cited by examiner

*Primary Examiner* — Kevin Mew
(74) *Attorney, Agent, or Firm* — McGarry Bair PC

(57) ABSTRACT

An Ethernet Switch Ring (ESR) protection method for introducing the pre-up state for the transit node, includes, after a loop failure is recovered, the transit node on the loop entering the pre-up state if not receiving the loop failure protocol message within a set time. And when the transit node is in the pre-up state and the loop fails again, i.e., the transit node receives the loop failure protocol message in the pre-up state, the transit node opens the master and slave ports and refreshes the MAC address. Effectively, the transit node is an ESR transit node.

9 Claims, 6 Drawing Sheets

US 8,670,305 B2

ETHERNET SWITCH RING (ESR) PROTECTION METHOD AND TRANSIT NODE

CROSS-REFERENCE TO RELATED APPLICATIONS

This application is a National Phase application of International Application No. PCT/CN2010/072933, filed May 19, 2010, which claims the benefit of Chinese Patent Application No. 200910092368.4, filed Sep. 7, 2009, both of which are incorporated herein by reference in their entirety.

FIELD OF THE INVENTION

The present invention relates to the protection field of ring networks, in particular to an ethernet switch ring (ESR) protection method and transit node for the multiple points failure in the ESR protection.

BACKGROUND OF THE INVENTION

In an Ethernet network, the way to improve reliability is mainly by deploying some redundant links. Therefore, backup links can be used when the main link is failed. The ZTE Ethernet Switch Ring (ZESR) proposes a ring network protection method based on this application. Each ring has a link, which is called a ring protection link, and when the links protected by the rings are all in good condition, at least one of the two ports of the ring protection link is blocked so as to prevent protected data from passing through the link. For the protection of the multiple points failure on the loop (i.e., another single point failure occurs on the loop during the recovery of a single point failure), the rapid response capability of the loop is also essential to the ring network protection.

At present, in the ring network protection method, each node on the loop is given different roles respectively: a master node and transit nodes, and there is only one master node in a ring, the rest are all transit nodes. When all the links are in a good condition, the master node will block slave ports to prevent the protected data from forming a ring. When a failure occurs on the loop, the master node will open the blocked slave ports to back up the link. The states defined for the master node are: init, pre-up, up, and down, and the states defined for the slave node are: init, up and down, wherein init is the initial state which happens after the domain configuration; the master node and transit nodes are all in up state when there is no failure on the loop and are all in down state when there is a failure; and the pre-up state is the transitional state of the loop from down to up and is the special state of the master node.

FIG. 1 is a diagram of ESR protection according to the conventional art. As shown in FIG. 1, nodes S1, S2, S3 and S4 support the Ethernet network switching function and they establish an ESR protection domain, wherein node S1 is the master node, and nodes S2, S3 and S4 are transit nodes. The ESR protection domain includes a closed ring composed of nodes S1, S2, S3 and S4. When the links protected by the ring are all in good condition, the master node S1 blocks the slave port and each node shows the loop state of up.

FIG. 2 is a diagram showing the situation of the loop after the ESR protection has a link failure according to the conventional art. As shown in FIG. 2, when a loop is failed, for example the link between the nodes S3 and S4 in FIG. 1 is failed, the nodes S3 and S4 will block the ports of the failed link and simultaneously send out a loop failure protocol message. After receiving the loop failure message, the master node will switch the link, i.e., opening the slave ports, and sends a protocol message to notify each transit node of the state change of the loop. And the transit node will set the loop state to down and will refresh a Media Access Control (MAC) address table after receiving the notification from the master node. At the moment, each node shows the loop state of down. If the loop is recovered, in order to prevent a loop, the failed node will stop sending the link failure protocol message to wait for the notification from the master node rather than opening the recovered port at once. The master node will consider that the loop failure has been recovered when not receiving the loop failure message within a certain time, and at the moment, the master node will switch back the flow, i.e., making the protected traffic flow transmitted from the link where the master port is located, and blocks the slave ports. In order to prevent the master port from port oscillating and ensure the normal work of the master port, the protocol sets the pre-up state for the master node. The master node will enter the pre-up state when not receiving the loop failure protocol message within a certain time. FIG. 3 is a diagram showing the situation of the loop when the ESR protection failure is just recovered according to the conventional art. As shown in FIG. 3, a pre-up timer is started in the pre-up state, and after the timer is timed out, the master port is opened, the slave ports are blocked, the loop is recovered to the up state, and the master node notifies each transit node of the state change. Each transit node will switch the loop state from down to up after receiving the notification from the master node, and the failed nodes S3 and S4 further need to open the failed ports to ensure the normal flow.

If the loop is failed again in the pre-up state, in this case the transit node that detects the failure will send the loop failure protocol message to the master node. When the master node receives the loop failure protocol message, it will only process according to the loop failure and will send the protocol message to notify each node to enter the down state. In this case, the most efficient method for ensuring the smooth flow of the loop is to open the recovered failed ports at once. However, the master node cannot notify the recovered failed ports to open due to the received loop failure protocol message.

FIG. 4 is a diagram showing a second failure in the ESR according to the conventional art. As shown in FIG. 4, when failure occurs again between nodes S2 and S3, the ports of the nodes S3 and S4 cannot be opened at once. Even if the port of the node S3 can be opened, the port of the node S4 cannot be opened, and the MAC address cannot be refreshed. Therefore, the flow is still unsmooth, and thereby the ring network protection capability and user experience are affected.

SUMMARY OF THE INVENTION

For the reasons above, the main objective of the present invention is to provide an ESR protection method and transit node, which can improve the ring network protection capability as well as the user experience.

To achieve the objective, the technical solution of the present invention is implemented as follows.

An ESR protection method, for introducing a pre-up state for transit nodes, comprising:

after a loop failure is recovered, the transit node on the loop entering the pre-up state if not receiving a loop failure protocol message within a set time; and when the transit node is in the pre-up state and the loop is failed again, i.e., the transit node receives the loop failure protocol message in the pre-up state, the transit node opening a master and a slave ports and refreshes a MAC address.

When the loop failure occurs, the method specifically comprises:

the failed transit node that detects the loop failure periodically sending the loop failure protocol message to other nodes on the loop;

a master node switching the loop state to down state and sending a loop failure update protocol message to each transit node after receiving the loop failure protocol message from the failed node; and the transit node updating the loop state to down state and refreshing the MAC address after receiving the loop failure update protocol message.

After the loop failure is recovered, the method specifically comprises:

the failed transit node stopping sending the loop failure protocol message and setting the recovered port to a preforward state; and the failed transit node entering the pre-up state after stopping sending the loop failure protocol message for the set time, and other transit nodes on the loop also entering the pre-up state when not receiving the loop failure protocol message within the set time.

When the transit node is in the pre-up state and the loop is failed again, the method specifically comprises:

the failed transit node that detects the loop failure this time blocking the failed port, and periodically sending the loop failure protocol message to other nodes on the loop; and other transmit nodes receiving the loop failure protocol message in the pre-up state, opening the master and slave ports at once, and refreshing the MAC address.

The method further comprises: the master node entering the pre-up state when not receiving the loop failure protocol message within the set time.

The method further comprises: the master node receiving the loop failure protocol message in the pre-up state and opening the master and the slave ports at once.

An ESR transit node comprises: a failure detection unit, a loop failure protocol message receiving unit, a state maintenance unit and an execution unit, wherein the failure detection unit is adapted for detecting whether a loop failure is recovered and notifying the state maintenance unit when the loop failure is recovered;

the loop failure protocol message receiving unit is adapted for receiving a loop failure protocol message and notifying the state maintenance unit after receiving the loop failure protocol message;

the state maintenance unit is adapted for switching the loop state to a pre-up state when not receiving the loop failure protocol message within a set time, and notifying the execution unit when the loop state is in the pre-up state and the notification from the loop failure protocol message receiving unit is received; and the execution unit is adapted for opening a master port and a slave port and refreshing a MAC address after receiving the notification from the state maintenance unit.

The ESR transit node further comprises a loop failure protocol message sending unit, and a loop failure update protocol message receiving unit, and the failure detection unit is further adapted for detecting whether the loop failure occurs and notifying the loop failure protocol message sending unit when the loop failure occurs;

the loop failure protocol message sending unit is adapted for periodically sending the loop failure protocol message to other nodes on the loop after receiving the notification from the failure detection unit;

the loop failure update protocol message receiving unit is adapted for receiving the failure update protocol messages from other loop nodes and notifying the state maintenance unit; and the state maintenance unit is further adapted for updating the loop state to a down state according to the failure update protocol message and notifying the execution unit to refresh the MAC address.

The failure detection unit is further adapted for notifying the loop failure protocol message sending unit when detecting that the loop failure is recovered;

the loop failure protocol message sending unit is further adapted for stopping sending the loop failure protocol message and notifying the execution unit after receiving the notification from the failure detection unit; and the execution unit is further adapted for setting the recovered port to a preforward state after receiving the notification from the loop failure protocol message sending unit.

In the ESR protection method and transit node, the pre-up state is introduced for the transit node which will enter the pre-up state when not receiving the loop failure protocol message within the set time; and all the failure-free ports of the transit node on the loop are opened when the transit node receives the loop failure protocol message in the pre-up state. Since the pre-up state is introduced for the transit node and the transit node controls whether to open the recovered failed port by itself, the unsmooth flow caused by the master node which cannot notify the recovered failed port to open is avoided, and the ring network protection capability and user experience can be improved.

DETAILED DESCRIPTION OF THE EMBODIMENTS

The basic idea of the present invention is that: the pre-up state is introduced for the transit nodes which will enter the pre-up state when not receiving the loop failure protocol message within the set time. When a transit node receives the loop failure protocol message in the pre-up state, all the failure-free ports of the transit node on the loop are opened.

The implementation of the technical solution is further described below in detail with reference to the drawings.

Figure 1:
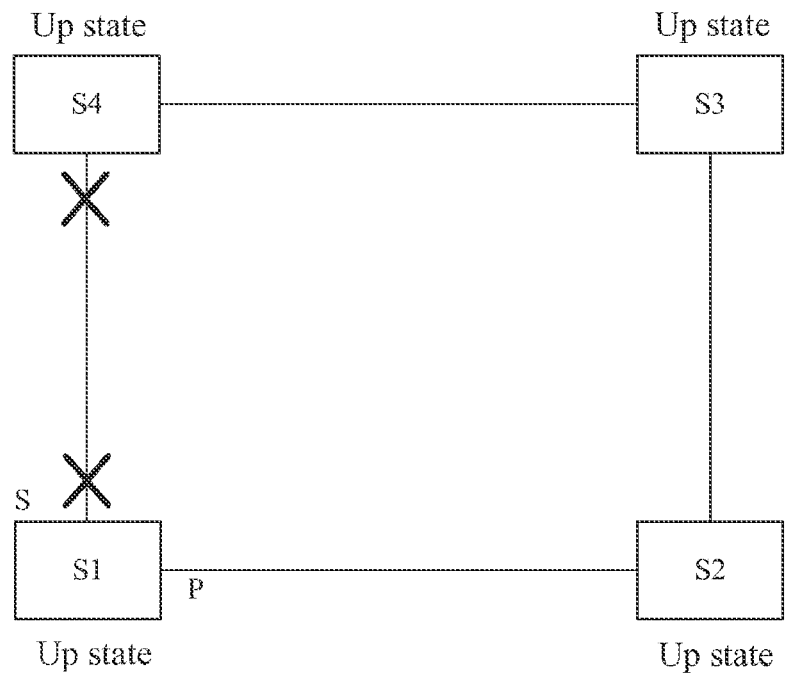
FIG. 1 is a diagram of ESR protection according to the conventional art.
Figure 2:
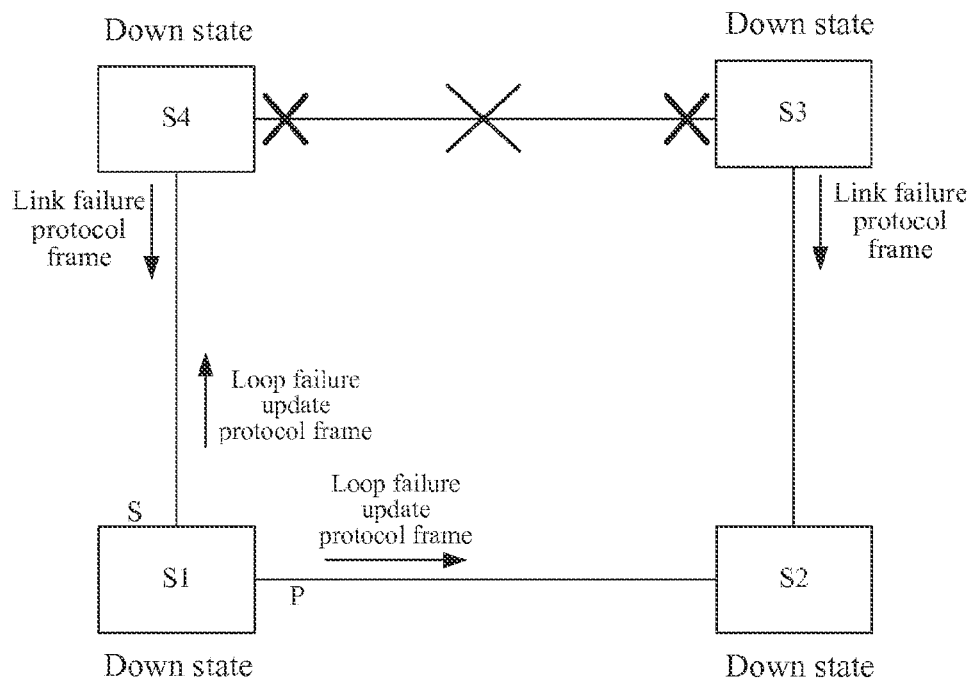
FIG. 2 is a diagram showing the situation of a loop after the ESR protection has a link failure according to the conventional art.
Figure 3:
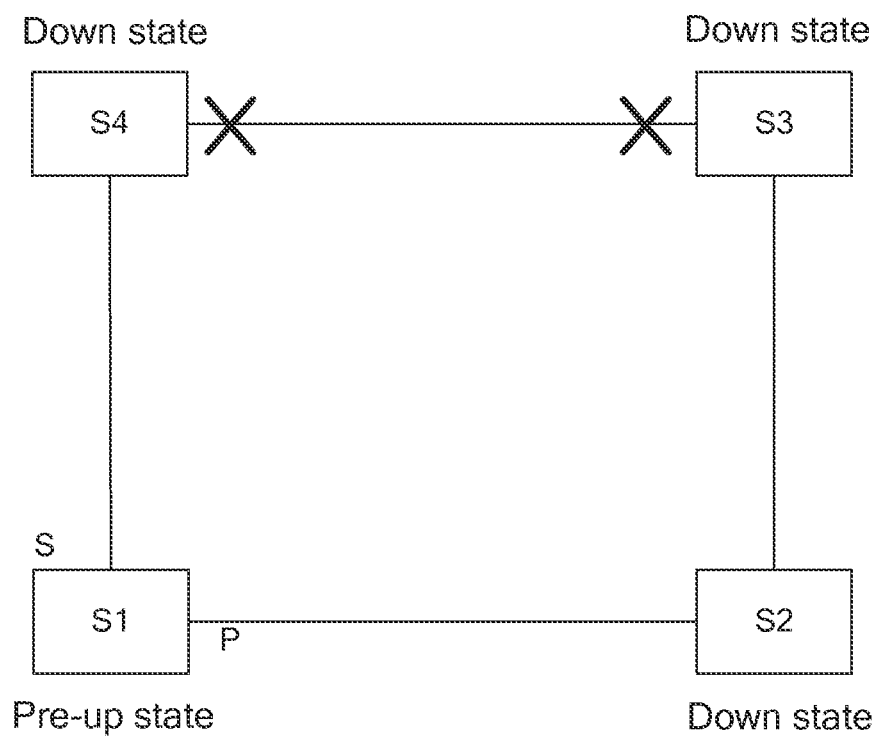
FIG. 3 is diagram showing the situation of a loop when the ESR protection failure is just recovered according to the conventional art.
Figure 4:
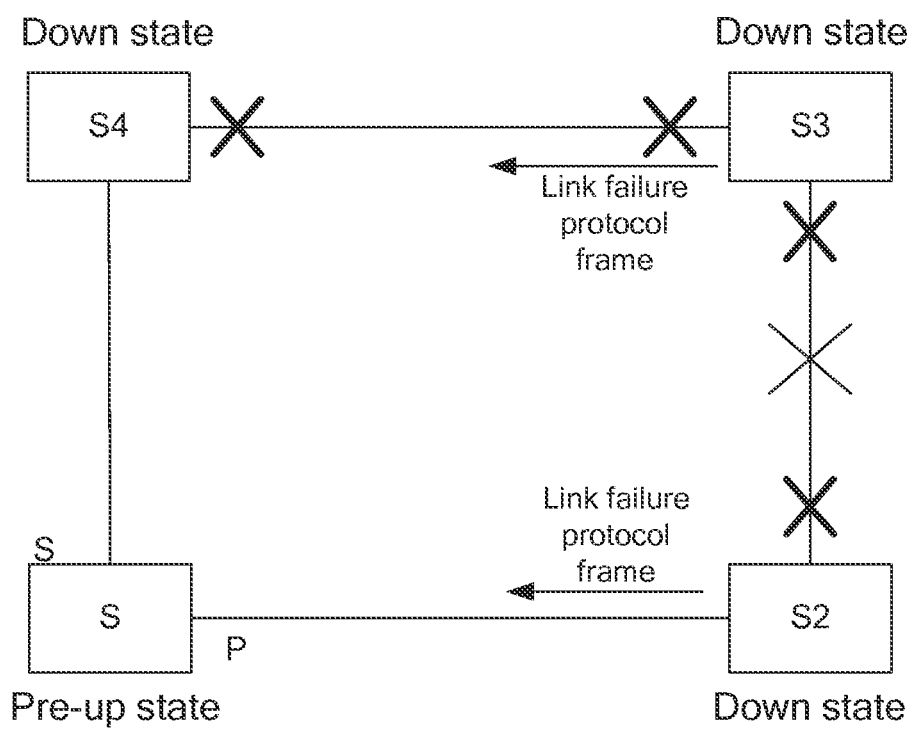
FIG. 4 is a diagram showing a second failure in the ESR according to the conventional art.
Figure 5:
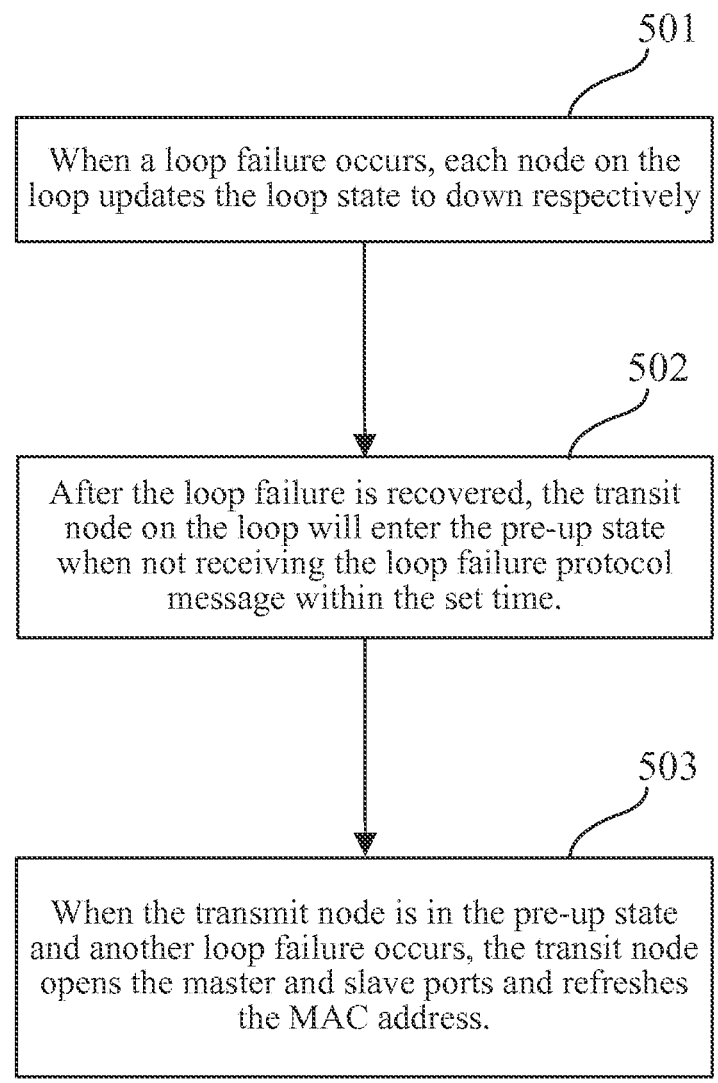
FIG. 5 is a diagram showing the flow of an ESR protection method of the present invention.

FIG. 5 is a diagram showing the flow of an ESR protection method of the present invention. As shown in FIG. 5, the ESR protection method generally includes the following steps.

Step 501: When a loop failure occurs, each node on the loop updates the loop state to down respectively.

Specifically, when a transit node on the loop detects the loop failure, the failed transit node will periodically send the loop failure protocol message to other nodes on the loop; the master node switches the loop state to down and sends a loop failure update protocol message to each transit node after receiving the loop failure protocol message from the failed node; and the transit node updates the loop state to down and refreshes the MAC address after receiving the loop failure update protocol message.

Step 502: After the loop failure is recovered, the transit node on the loop will enter the pre-up state when not receiving the loop failure protocol message within the set time.

Specifically, after the loop failure is recovered, the failed transit node stops sending the loop failure protocol message and sets the recovered port to a preforward state; and the failed transit node enters the pre-up state after stopping sending the loop failure protocol message for a set time, and other transit nodes on the loop also enter the pre-up state when not receiving the loop failure protocol message within the set time.

In addition, the master node also enters the pre-up state when not receiving the loop failure protocol message within the set time.

Step 503: When the transmit node is in the pre-up state and another loop failure occurs, the transit node opens the master and slave ports and refreshes the MAC address.

Specifically, when another transit node on the loop detects the loop failure, the failed transit node that detects the loop failure this time blocks the failed port, and periodically sends the loop failure protocol message to other nodes on the loop. Other transit nodes receive the loop failure protocol message in the pre-up state, determine that another failure occurs on the loop, open the master and slave ports at once, and refresh the MAC address. The transit node recovered from failure sets the port, which has been recovered to be in the preforward state, to the open state.

In addition, the master node will also open the master and slave ports at once when receiving the loop failure protocol message in the pre-up state.

The present invention further discloses an ESR transit node, comprising: a failure detection unit, a loop failure protocol message receiving unit, a state maintenance unit and an execution unit, wherein, the failure detection unit is adapted for detecting whether the loop failure is recovered and notifying the state maintenance unit when the loop failure is recovered;

the loop failure protocol message receiving unit is adapted for receiving the loop failure protocol message and notifying the state maintenance unit after receiving the loop failure protocol message;

the state maintenance unit is adapted for switching the loop state to the pre-up state when not receiving the loop failure protocol message within the set time, and notifying the execution unit when the loop is in the pre-up state and the notification from the loop failure protocol message receiving unit is received; and the execution unit is adapted for opening the master and slave ports and refreshing the MAC address after receiving the notification from the state maintenance unit.

The ESR transit node further includes a loop failure protocol message sending unit, and a loop failure update protocol message receiving unit.

The failure detection unit is further adapted for detecting whether the loop failure occurs and notifying the loop failure protocol message sending unit when the loop failure occurs.

The loop failure protocol message sending unit is adapted for periodically sending the loop failure protocol message to other nodes on the loop after receiving the notification from the failure detection unit.

The failure update protocol message receiving unit is adapted for receiving the failure update protocol messages from other loop nodes and notifying the state maintenance unit.

The state maintenance unit is further adapted for updating the loop state to the down state according to the failure update protocol message and notifying the execution unit to refresh the MAC address.

The failure detection unit is further adapted for notifying the loop failure protocol message sending unit when detecting that the loop failure is recovered.

The loop failure protocol message sending unit is further adapted for stopping sending the loop failure protocol message and notifying the execution unit after receiving the notification from the failure detection unit.

The execution unit is further adapted for setting the recovered port to the preforward state after receiving the notification from the loop failure protocol message sending unit.

First Embodiment

Figure 6:
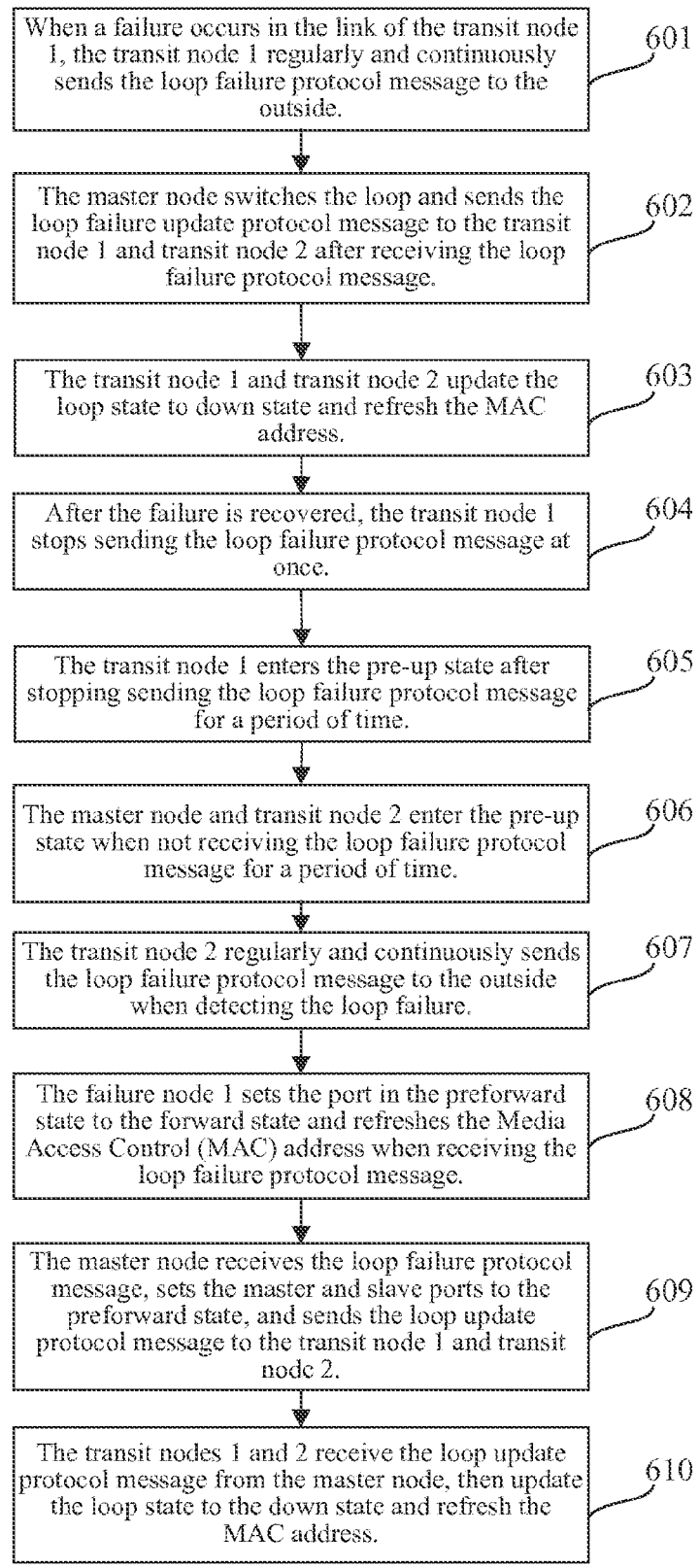
FIG. 6 is a diagram showing the flow of an ESR protection method of the first embodiment of the present invention.

In this embodiment, the loop includes a master node, a transit node 1 and a transit node 2. FIG. 6 is a diagram showing the flow of an ESR protection method of the first embodiment of the present invention. As shown in FIG. 6, the ESR protection method comprises the following steps.

Step 601: When a failure occurs in the link of the transit node 1, the transit node 1 regularly and continuously sends out the loop failure protocol message.

Step 602: The master node switches the loop and sets the loop state to the down state, and sends the loop failure update protocol message to the transit node 1 and transit node 2 after receiving the loop failure protocol message from the transit node 1.

Step 603: The transit node 1 and transit node 2 update the loop state to the down state and refresh the MAC address after receiving the loop failure update protocol message from the master node.

Step 604: After the failure is recovered, the transit node 1 stops sending the loop failure protocol message at once and sets the recovered port to the preforward state.

Step 605: The transit node 1 enters the pre-up state after stopping sending the loop failure protocol message for a period of time (such as 8 s).

Step 606: The master node and transit node 2 enter the pre-up state when not receiving the loop failure protocol message for a period of time (such as 8 s).

Generally, the master node and transit nodes will enter the pre-up state when not receiving the loop failure protocol message for the same period of time.

Step 607: The transit node 2 blocks the failed port and regularly and continuously sends out the loop failure protocol message when detecting the loop failure.

Step 608: The failure node 1 sets the port, which has been recovered to be in the preforward state, to the forward state at once and refreshes the MAC address when receiving the loop failure protocol message and determining that another failure occurs on the loop.

Step 609: The master node receives the loop failure protocol message, sets the master and slave ports to the forward state, and sends the loop update protocol message to the transit node 1 and transit node 2 to notify them of the loop state of down and notify each node to refresh the MAC address.

Step 610: The transit nodes 1 and 2 receive the loop update protocol message from the master node, and then update the loop state to the down state and refresh the MAC address, and the loop is recovered to the single point failure process flow.

It can be seen that the loop protection problem of multiple points failure can be effectively solved by setting the pre-up state for the transit node, and processing the port in the preforward state when the transit node receives the loop failure protocol message in the pre-up state.

Second Embodiment

Figure 7:
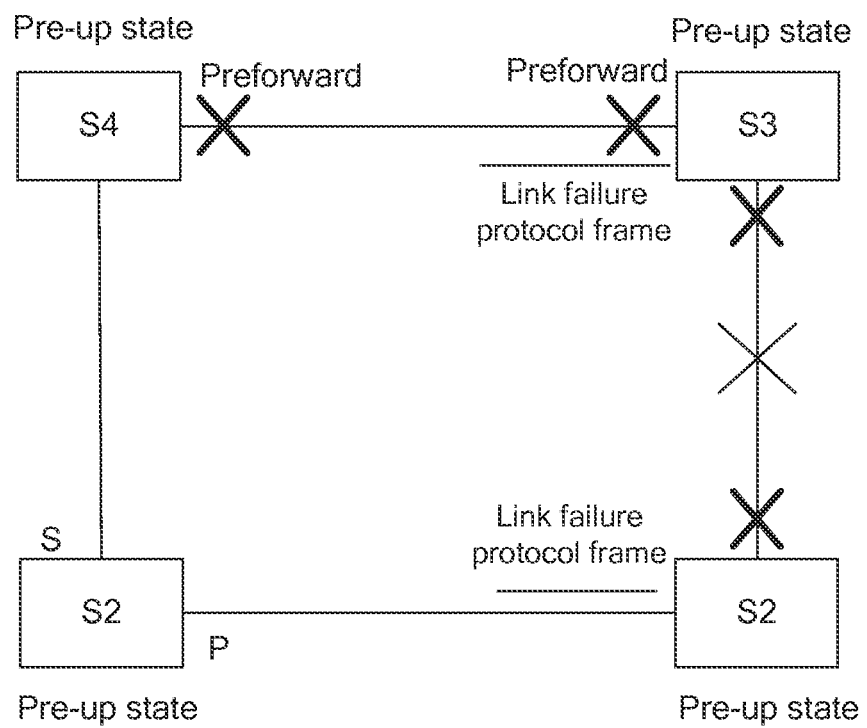
FIG. 7 is a diagram showing an ESR of the second embodiment of the present invention.

FIG. 7 is a diagram of an ESR of the second embodiment of the present invention. As shown in FIG. 7, nodes S1, S2, S3 and S4 compose the ESR, wherein S1 is the master node and other nodes are the transit nodes. A failure first occurs in the link between the nodes S3 and S4. When the link between the nodes S3 and S4 is recovered from the failure, the nodes S3 and S4 will stop sending the loop failure protocol message and set the port on the loop to the preforward state to wait for the loop recovery update protocol message from the master node. In addition, the master node S1 and each transit node will enter the pre-up state when not receiving the loop failure protocol message for a period of time and enter the up state after the pre-up state is timed out. If another failure occurs on the loop when each node is in the pre-up state, for example a failure occurs in the link between the nodes S2 and S3, the nodes S2 and S3 will send out the loop failure protocol message. When the node S4 receives the loop failure protocol message and is in the pre-up state at the moment, and the port is in the preforward state, the port on the loop is opened, with the process flow being the same as that of the node S3.

What described above are only preferred embodiments of the present invention, and the protection scope of the present invention is not limited herein.

What is claimed is:

1. An ethernet switch ring (ESR) protection method, introducing a transitional pre-up state for transit nodes, and comprising:
    after a loop failure is recovered, a transit node on the loop entering the pre-up state if not receiving a loop failure protocol message within a set time; and
    when the transit node is in the pre-up state and the loop is failed again the transit node receives the loop failure protocol message in the pre-up state, the transit node opening a master port and a slave port and refreshing a MAC address.

2. The ESR protection method according to claim 1, wherein when the loop failure occurs, the method further comprises:
    a failed transit node that detects the loop failure periodically sending the loop failure protocol message to other nodes on the loop;
    a master node switching the loop state to a down state and sending a loop failure update protocol message to each transit node after receiving the loop failure protocol message from the failed transit node; and
    the transit nodes updating the loop state to the down state and refreshing the MAC address after receiving the loop failure update protocol message.

3. The ESR protection method according to claim 2, wherein after the loop failure is recovered, the method further comprises:
    the failed transit node stopping sending the loop failure protocol message and setting the recovered port to a preforward state; and
    the failed transit node entering the pre-up state after stopping sending the loop failure protocol message for a set time, and the other transit nodes on the loop also entering the pre-up state when not receiving the loop failure protocol message within the set time.

4. The ESR protection method according to claim 2, wherein when the transit node is in the pre-up state and the loop is failed again, the method further comprises:
    the failed transit node that detects the loop failure this time blocking the failed port, and periodically sending the loop failure protocol message to other nodes on the loop; and the other transmit nodes receiving the loop failure protocol message in the pre-up state, opening the master ports and the slave ports at once, and refreshing the MAC address.

5. The ESR protection method according to claim 3, wherein the method further comprises: the master node entering the pre-up state when not receiving the loop failure protocol message within the set time.

6. The ESR protection method according to claim 4, wherein the method further comprises: the master node receiving the loop failure protocol message in the pre-up state and opening the master port and the slave port at once.

7. An ethernet switch ring (ESR) transit node, comprising: a failure detection unit, a loop failure protocol message receiving unit, a state maintenance unit and an execution unit, wherein
    the failure detection unit, configured to detect whether a loop failure is recovered and to notify the state maintenance unit when the loop failure is recovered;
    the loop failure protocol message receiving unit, configured to receive a loop failure protocol message and to notify the state maintenance unit after receiving the loop failure protocol message;
    the state maintenance unit, configured to switch the loop state to a pre-up state when not receiving the loop failure protocol message within a set time, and to notify the execution unit when the loop state is in the pre-up state and the notification from the loop failure protocol message receiving unit is received; and
    the execution unit, configured to open a master port and a slave port and refresh a MAC address after receiving the notification from the state maintenance unit.

8. The ESR transit node according to claim 7, wherein the ESR transit node further comprises a loop failure protocol message sending unit, and a loop failure update protocol message receiving unit, and wherein
    the failure detection unit is further configured to detect whether the loop failure occurs and notify the loop failure protocol message sending unit when the loop failure occurs;
    the loop failure protocol message sending unit is configured to periodically send the loop failure protocol message to other nodes on the loop after receiving the notification from the failure detection unit;
    the loop failure update protocol message receiving unit is configured to receive the failure update protocol messages from other loop nodes and notify the state maintenance unit; and
    the state maintenance unit is further configured to update the loop state to a down state according to the failure update protocol message and notify the execution unit to refresh the MAC address.

9. The ESR transit node according to claim 8, wherein
the failure detection unit, further configured to notify the loop failure protocol message sending unit when detecting that the loop failure is recovered;
the loop failure protocol message sending unit, further configured to stop sending the loop failure protocol message and to notify the execution unit after receiving the notification from the failure detection unit; and
the execution unit, further configured to set the recovered port to a preforward state after receiving the notification from the loop failure protocol message sending unit.

\* \* \* \* \*